US011962992B2

(12) United States Patent
Laitinen et al.

(10) Patent No.: US 11,962,992 B2
(45) **Date of Patent: *Apr. 16, 2024**

(54) SPATIAL AUDIO PROCESSING

(71) Applicant: NOKIA TECHNOLOGIES OY, Espoo (FI)

(72) Inventors: Mikko-Ville Laitinen, Helsinki (FI); Mikko Tammi, Tampere (FI); Jussi Virolainen, Espoo (FI); Jorma Mäkinen, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 17/953,134

(22) Filed: Sep. 26, 2022

(65) Prior Publication Data

US 2023/0024675 A1 Jan. 26, 2023

Related U.S. Application Data

(63) Continuation of application No. 16/625,597, filed as application No. PCT/FI2018/050429 on Jun. 8, 2018, now Pat. No. 11,457,326.

(30) Foreign Application Priority Data

Jun. 20, 2017 (GB) .................................. 1709804.7

(51) Int. Cl.
*H04S 7/00* (2006.01)
*H04R 1/40* (2006.01)

(52) U.S. Cl.
CPC ............... *H04S 7/30* (2013.01); *H04R 1/406* (2013.01); *H04S 2400/01* (2013.01)

(58) Field of Classification Search
CPC ... G10L 19/008; G10L 19/0204; H04S 3/008; H04S 2400/11; H04S 2420/11; H04S 7/305; H04R 2430/01; H04R 2201/401
(Continued)

(56) References Cited

U.S. PATENT DOCUMENTS 8,180,062 B2 5/2012 Turku et al.
8,374,365 B2 * 2/2013 Goodwin ................ H04S 1/002 704/502

(Continued)

FOREIGN PATENT DOCUMENTS

EP 1 786 240 A2 5/2007
EP 2 146 522 A1 1/2010

(Continued)

OTHER PUBLICATIONS

Extended European Search Report for European Patent Application No. 18820183.4 dated Feb. 4, 2021, 8 pages.

(Continued)

*Primary Examiner* — Alexander Krzystan
(74) *Attorney, Agent, or Firm* — ALSTON & BIRD LLP

(57) ABSTRACT

According to an example embodiment, a method for processing a multi-channel input audio signal representing a sound field into a multi-channel output audio signal representing said sound field in accordance with a predefined loudspeaker layout is provided, the method comprising the following for at least one frequency band: obtaining spatial audio parameters that are descriptive of spatial characteristics of said sound field; estimating a signal energy of the sound field represented by the multi-channel input audio signal; estimating, based on said signal energy and the obtained spatial audio parameters, respective output signal energies for channels of the multi-channel output audio signal according to said predefined loudspeaker layout;

(Continued)

determining a maximum output energy as the largest of the output signal energies across channels of said multi-channel output audio signal; and deriving, on basis of said maximum output energy, a gain value for adjusting sound reproduction gain in at least one of said channels of the multi-channel output audio signal.

20 Claims, 5 Drawing Sheets

(58) Field of Classification Search
USPC ............... 381/310, 303, 307, 22, 23; 700/94
See application file for complete search history.

(56) References Cited

U.S. PATENT DOCUMENTS

| | | | | |
|---|---|---|---|---|
| 8,600,076 | B2 | 12/2013 | Choi et al. | |
| 8,705,319 | B2 | 4/2014 | Kallinger et al. | |
| 9,865,274 | B1 * | 1/2018 | Vicinus | H04N 7/147 |
| 10,869,155 | B2 * | 12/2020 | Makinen | H04R 3/005 |
| 2005/0063554 | A1 * | 3/2005 | Devantier | H04S 7/302 381/98 |
| 2008/0232617 | A1 | 9/2008 | Goodwin et al. | |
| 2012/0128174 | A1 | 5/2012 | Tammi et al. | |
| 2013/0044884 | A1 | 2/2013 | Tammi et al. | |
| 2013/0268280 | A1 | 10/2013 | Del Galdo et al. | |
| 2015/0286459 | A1 | 10/2015 | Habets et al. | |
| 2016/0029140 | A1 | 1/2016 | Mehta et al. | |
| 2016/0198282 | A1 | 7/2016 | Kim et al. | |
| 2017/0026771 | A1 | 1/2017 | Shuang et al. | |
| 2017/0078819 | A1 | 3/2017 | Habets et al. | |
| 2017/0086008 | A1 | 3/2017 | Robinson | |

FOREIGN PATENT DOCUMENTS

| | | | |
|---|---|---|---|
| WO | WO 2017/005975 | A1 | 1/2017 |
| WO | WO 2017/005978 | A1 | 1/2017 |

OTHER PUBLICATIONS

Final Office Action for U.S. Appl. No. 16/625,597 dated Feb. 22, 2022.

International Search Report and Written Opinion for Application No. PCT/FI2018/050429 dated Oct. 25, 2018, 11 pages.

Kowalczyk, K. et al., Parametric Spatial Sound Processing (published Feb. 12, 2015) IEEE Signal Processing Magazine (Mar. 2015) 31-42.

Non-Final Office Action for U.S. Appl. No. 16/625,597 dated Nov. 9, 2021.

Notice of Allowance for U.S. Appl. No. 16/625,597 dated Jun. 10, 2022.

Notice of Allowance for U.S. Appl. No. 16/625,597 dated May 13, 2022.

Perez-Gonzalez, E. et al., Automatic Gain and Fader Control for Live Missing, IEEE Workshop on Applications of Signal Processing to Audio and Acoustics (Oct. 2009), 4 pages.

Pulkki et al.; "Spatial Sound Reproduction with Directional Audio Coding"; JAES, AES, 60 East 42nd Street, Room 2520, New York 10165-2520, USA; vol. 55, No. 6, Jun. 1, 2007; pp. 503-516; XP040508257.

Pulkki, V., Virtual Source Positioning Using Vector Base Amplitude Panning, J. Audio Eng. Soc., vol. 45 (Jun. 1997) 456-466.

* cited by examiner

SPATIAL AUDIO PROCESSING

CROSS-REFERENCE TO RELATED APPLICATIONS

The present application is a continuation of U.S. application Ser. No. 16/625,597, filed Dec. 20, 2019, which is a national phase entry of International Application No. PCT/FI2018/050429, filed Jun. 8, 2018, which claims priority to GB Application No. 1709804.7, filed on Jun. 20, 2017, the contents of which are incorporated herein by reference in their entirety.

TECHNICAL FIELD

The example and non-limiting embodiments of the present invention relate to processing spatial audio signals for loudspeaker reproduction.

BACKGROUND

Spatial audio capture and/or processing enables extracting and/or storing information that represents a sound field and using the extracted information for rendering audio that conveys a sound field that is perceptually similar to the captured one with respect to both directional sound components of the sound field as well as the ambience of the sound field. In this regard, directional sound components typically represent distinct sound sources that have certain position within the sound field (e.g. a certain direction of arrival and a certain distance with respect to an assumed listening point), whereas the ambience represents environmental sounds within sound field. Listening to such a sound field enables the listener to experience a sound field as he or she was at the location the sound field serves to represent. The information representing a sound field may be stored and/or transmitted in a predefined format that enables rendering audio that approximates the sound field for the listener via headphones and/or via a loudspeaker arrangement.

The information representing a sound field may be obtained by using a microphone arrangement that includes a plurality of microphones to capture a respective plurality of audio signals (i.e. two or more audio signals) and processing the audio signals into a predefined format that represents the sound field. Alternatively, the information that represents a sound field may be created on basis of one or more arbitrary source signals by processing them into a predefined format that represents the sound field of desired characteristics (e.g. with respect to directionality of sound sources and ambience of the sound field). As a further example, a combination of a captured and artificially generated sound field may be provided e.g. by complementing information that represents a sound field captured by a plurality of microphones via introduction of one or more further sound sources at desired spatial positions of the sound field.

Regardless of their origin, the plurality of audio signals that convey an approximation of the sound field may be referred to as a spatial audio signal. In many application scenarios the spatial audio signal is created and/or provided together with spatially and temporally synchronized video content. However, this disclosure concentrates on processing of the spatial audio signal.

At least some spatial audio reproduction techniques known in the art carry out spatial processing to process a sound field represented by respective input audio signals obtained from a plurality of microphones of a microphone arrangement/array into a spatial audio signal suitable for reproduction by using headphones or a predefined multichannel loudspeaker layout. As an example in this regard, the spatial processing may include a spatial analysis for extracting spatial audio parameters that include directions of arrival (DOA) and the ratios between direct and ambient components in the input audio signals from the microphones and a spatial synthesis for synthesizing a respective output audio signal for each loudspeaker of the predefined layout on basis of the input audios signals and the spatial audio parameters, the output audio signals thereby serving as the spatial audio signal.

While such approach provides a perfectly functional spatial audio reproduction, one challenge in such a technique is the fixed (or constant) gain of the processing chain, which does not take into account the level and dynamics of the audio content in the input audio signals: since sound level and dynamics of the audio content may vary to a large extent depending on the characteristics of the sound field, at least some of the output audio signals of the resulting spatial audio signal may have too much headroom or alternatively clipping of audio may occur, depending on, e.g., the selected fixed (or constant) gain and/or the signal level recorded by the microphones. Herein, the term headroom denotes unused part of the dynamic range between the actual maximum signal level and the maximum signal level that does not cause clipping of audio.

Another challenge may arise from a scenario where the input audio signals are captured by the microphones at a higher resolution (e.g. 24 bits/sample) while the spatial processing (or the spatial synthesis) is carried out at a lower resolution (e.g. 16 bits/sample). In such a scenario, transformation from the higher resolution (that enables a higher dynamic range) to the lower resolution (enabling a smaller dynamic range) requires careful gain control to ensure avoiding the above-mentioned challenges with unnecessary headroom and/or clipping of audio.

Unnecessary headroom makes poor use of available dynamic range and hence unnecessarily makes listening to distant and/or silent sound sources difficult, which may constitute a significant challenge especially in spatial audio reproduction by portable devices that typically have limitations for the sound pressure provided by the loudspeakers and/or that are typically used in noisy listening environments. Clipping of audio, in turn, causes audible and typically highly annoying distortion to the reproduced spatial audio signal. Manual control of gain in the spatial processing may be applied to address the above-mentioned challenges with respect to unnecessary headroom and/or clipping of audio to some extent. However, manual gain control is inconvenient and also typically yields less than satisfactory results since manual control cannot properly react e.g. to sudden changes in characteristics of the captured sound field.

The above-mentioned challenges can be addressed at least to some extent via usage of automatic gain control (AGC) techniques known in the art. A straightforward AGC solution operates by computing respective input levels of the input audio signals and derives gain values to be used for scaling the output audio signals as part of the spatial processing in dependence of the input levels. However, since the most appropriate gain value for a given output audio signal depends also on e.g. direction characteristics of the sound field and the applied loudspeaker layout, an AGC technique that relies on input levels only does not fully address the above-mentioned problems but typically either unnecessary headroom and/or audio clipping still occurs in at least some output audio signals.

More advanced AGC techniques known in the art may rely on first computing the initial gain values on basis of the input levels of the input audio signals and deriving initial gain values to be used for scaling the output audio signals as part of the spatial processing in dependence of the input levels. Moreover, the initial gain values are applied to generate initial output audio signals for which respective initial output levels are computed. The initial output levels are used together with respective input levels to derive corrected gain values for determination of actual output audio signals. While such an iterative approach enables improved performance in terms of (reduced) unnecessary headroom and/or (reduced) audio clipping, an inherent drawback of such advanced AGC technique is the additional delay resulting from the two-step determination of the corrected gain values, which may be unacceptable for real-time applications such as telephony, audio conferencing and live audio streaming. Another drawback is increased computation arising from the two-step gain determination, which may constitute a significant additional computational burden especially in solutions where the AGC is applied on a frequency sub-band basis, which may be unacceptable e.g. in mobile devices.

SUMMARY

According to an example embodiment, a method for processing a multi-channel input audio signal representing a sound field into a multi-channel output audio signal representing said sound field in accordance with a predefined loudspeaker layout is provided, the method comprising the following for at least one frequency band: obtaining spatial audio parameters that are descriptive of spatial characteristics of said sound field; estimating a signal energy of the sound field represented by the multi-channel input audio signal; estimating, based on said signal energy and the obtained spatial audio parameters, respective output signal energies for channels of the multi-channel output audio signal according to said predefined loudspeaker layout; determining a maximum output energy as the largest of the output signal energies across channels of said multi-channel output audio signal; and deriving, on basis of said maximum output energy, a gain value for adjusting sound reproduction gain in at least one of said channels of the multi-channel output audio signal.

According to another example embodiment, an apparatus for processing a multi-channel input audio signal representing a sound field into a multi-channel output audio signal representing said sound field in accordance with a predefined loudspeaker layout is provided, the apparatus configured to perform the following: obtain spatial audio parameters that are descriptive of spatial characteristics of said sound field; estimate a signal energy of the sound field represented by the multi-channel input audio signal; estimate, based on said signal energy and the obtained spatial audio parameters, respective output signal energies for channels of the multi-channel output audio signal according to said predefined loudspeaker layout; determine a maximum output energy as the largest of the output signal energies across channels of said multi-channel output audio signal; and derive, on basis of said maximum output energy, a gain value for adjusting sound reproduction gain in at least one of said channels of the multi-channel output audio signal.

According to another example embodiment, a computer program is provided, the computer program comprising computer readable program code configured to cause performing at least a method according to the example embodiment described in the foregoing when said program code is executed on a computing apparatus.

The computer program according to an example embodiment may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Figure 1:
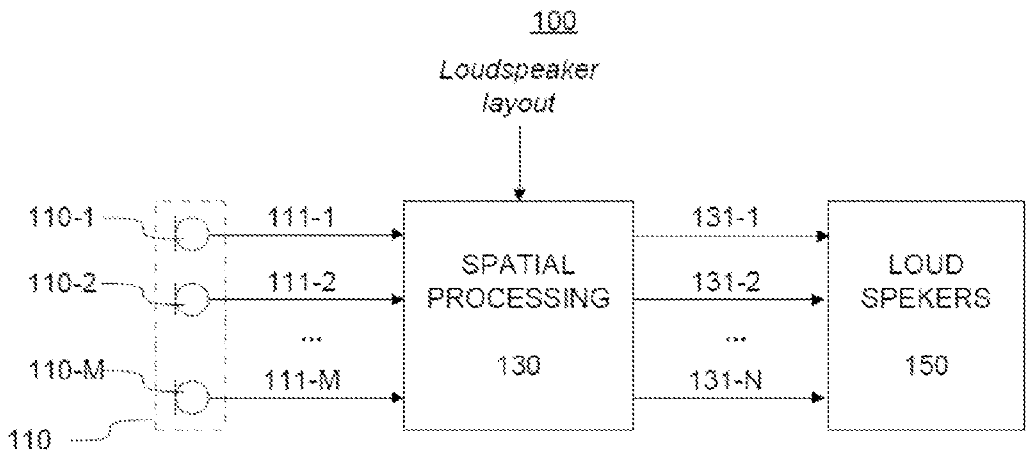
FIG. 1 illustrates a block diagram of some components and/or entities of an audio processing system within which one or more example embodiments may be implemented.

FIG. 1 illustrates a block diagram of some components and/or entities of a spatial audio processing system 100 that may serve as framework for various embodiments of a spatial audio processing technique described in the present disclosure. The audio processing system comprises an audio capturing entity 110 that comprises a plurality of microphones 110$m$ for capturing respective input audio signals 111-$m$ that represent a sound field in proximity of the audio capturing entity 110, a spatial audio processing entity 130 for processing the captured input audio signals 111-$m$ into output audio signals 131-$n$ in dependence of predefined loudspeaker layout, and a loudspeaker arrangement 150 according to the predefined loudspeaker layout for rendering a spatial audio signal conveyed by the output audio signals 131-*n*.

The input audio signals 111-*m* may also be referred to as microphone signals 111-*m*, whereas the output audio signals 131-*n* may also be referred to as loudspeaker signals 131-*n*. Moreover, without losing generality, the input audio signals 111-*m* may be considered to represent channels of a multi-channel input audio signal, whereas the output audio signals 131-*n* may be considered to represent channels of a multi-channel output audio signal or those of a multi-channel spatial audio signal.

The microphones 110*m* of the audio capturing entity 110 may be provided e.g. as a microphone array of as a plurality of microphones arranged in predefined positions with respect to each other. The audio capturing entity 110 may further include processing means for recording a plurality of digital audio signals that represent the sound captured by the respective microphone 110*m*. The recorded digital audio signals carry information that may be processed into one or more signals that enable conveying the sound field at the location of capture for presentation via the loudspeaker arrangement 150. The audio capturing entity 110 provides the plurality of digital audio signals to the spatial audio processing entity 130 as the respective input audio signals 111-*m* and/or stores these digital audio signals in a storage means for subsequent use.

Instead of using the audio capturing entity 110 as a source of the input audio signals 111-*m* as depicted in the example of FIG. 1, the audio processing system 100 may include a storage means for storing pre-captured or pre-created plurality of input audio signals 111-*m*. Hence, the audio processing chain may be based on the audio input signals 111-*m* read from the storage means instead of relying on input audio signals 111-*m* (directly) from the audio capturing entity 110.

The spatial audio processing entity 130 may comprise spatial audio processing means for processing the plurality of the input audio signals 111-*m* into the plurality of output audio signals 131-*n* that convey the sound field captured in the input audio signals 111-*m* in a format suitable for rendering using the predefined loudspeaker layout. The spatial audio processing entity 130 may provide the output audio signals 131-*n* for audio reproduction via the loudspeaker arrangement 150 and/or for storage in a storage means for subsequent use. The predefined loudspeaker layout may be any conventional loudspeaker layout known in the art, e.g. two-channel stereo, a 5.1-channel configuration or a 7.1-channel configuration or any known or arbitrary 2D or 3D loudspeaker layout.

Provision of the output audio signals 131-*n* from the spatial audio processing entity 130 to the loudspeaker arrangement 150 or to a device that is able to pass the output audio signals 131-*n* received therein for audio rendering via the loudspeaker arrangement 150 may comprise, for example, audio streaming between the two entities over a wired or wireless communication channel. In another example, this provision of the output audio signals 131-*n* may comprise the loudspeaker arrangement 150 or the device that is able to pass the output audio signals 131-*n* received therein for audio rendering via the loudspeaker arrangement 150 downloading the output audio signals 131-*n* from the spatial audio processing entity 130.

Instead of directly providing the output audio signals 131-*n* from the spatial audio processing entity 130 to the loudspeaker arrangement 150 as depicted in the example of FIG. 1, the audio processing system 100 may include a storage means for storing the output audio signals 131-*n* created by the spatial audio processing entity 130, from which the output audio signals 131-*n* may be subsequently provided from the storage means to the loudspeaker arrangement 150 for audio rendering therein. This provision of the output audio signals 131-*n* from the storage means to the loudspeaker arrangement 150 or to the device that is able to pass the output audio signals 131-*n* received therein for audio rendering via the loudspeaker arrangement 150 may be carried out using the mechanisms described in the foregoing for transfer of these signals (directly) from the spatial audio processing entity 130. Alternatively, the output audio signals 131-*n* may be provided from the storage means to an audio processing entity (not depicted in FIG. 1) for further processing of the output audio signals 131-*n* into a different format that is suitable for headphone listening.

Figure 2:
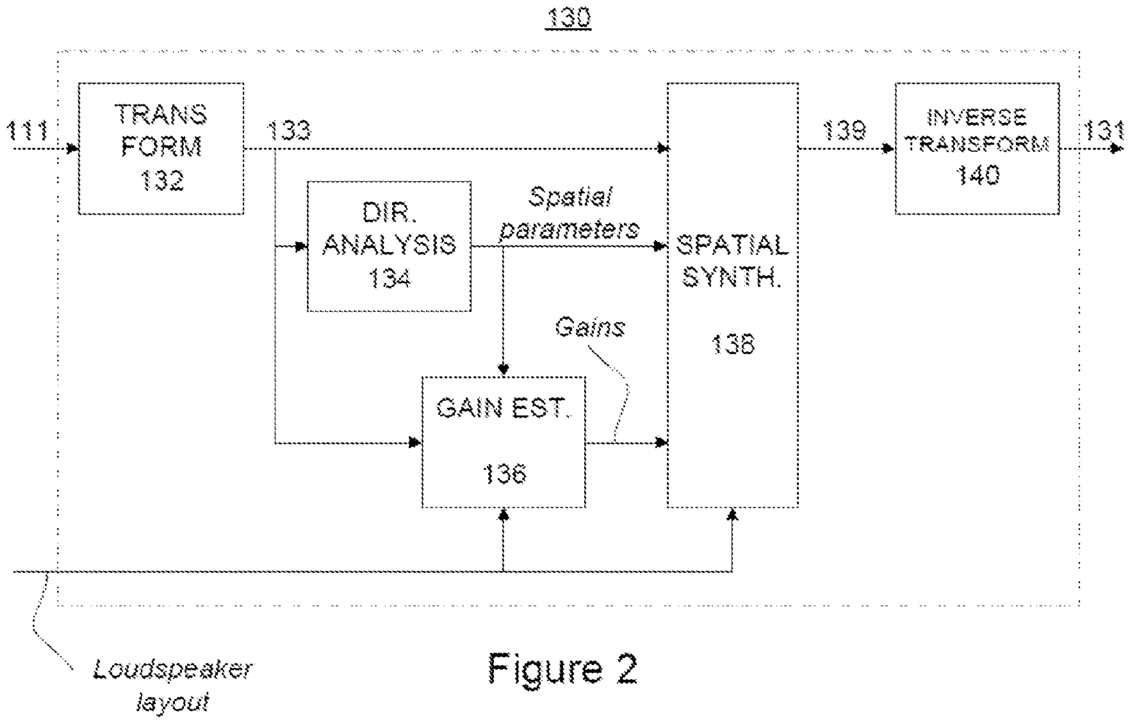
FIG. 2 illustrates a block diagram of some components and/or entities of a spatial processing entity according to an example.

In the following, some aspects of operation of the spatial audio processing entity 130 are described via a number of examples, whereas other entities of the audio processing system 100 are described to extent necessary for understanding of a respective aspect of operation of the spatial audio processing entity 130. In this regard, FIG. 2 illustrates a block diagram of some components and/or entities of the spatial audio processing entity 130 according to an example, while the spatial audio processing entity 130 may include further components and/or entities in addition to those depicted in FIG. 2. The spatial audio processing entity 130 serves to process the M input audio signals 111-*m* (that are represented in the example of FIG. 2 by a multi-channel input audio signal 111) into the N output audio signals 131-*n* (that are represented in FIG. 2 by a multi-channel output audio signal 131) using procedures described in the following via a number of examples. The input audio signals 111-*m* serve to represent a sound field captured by e.g. the microphone arrangement (or array) 110 of FIG. 1, whereas the output audio signals 131-*n* represent the same sound field or an approximation thereof such that representation is processed into a format suitable for rendering using the predefined loudspeaker layout. The sound field may also be referred to as an audio scene or as a spatial audio image.

The input audio signals 111-*m* are subjected to a time-to-frequency-domain transform by a transform entity 132 in order to convert the (time-domain) input audio signals 111-*m* into respective frequency-domain input audio signals 133-*m* (that are represented in the example of FIG. 2 by a multi-channel frequency-domain input audio signal 133). This conversion may be carried out by using a predefined analysis window length (e.g. 20 milliseconds), thereby segmenting each of the input audio signals 111-*m* into a respective time series of frames. As a non-limiting example, the transform entity 132 may employ short-time discrete Fourier transform (STFT), while another transform technique known in the art, such as quadrature mirror filter bank (QMF) or hybrid QMF, may be applied instead.

For each of the input audio signals 111-*m*, each frame may be further decomposed into a predefined non-overlapping frequency sub-bands (e.g. 32 frequency sub-bands), thereby resulting in respective time-frequency representations of the input audio signals 111-*m* that serve as basis for spatial audio analysis in a directional analysis entity 134 and for gain estimation in a gain estimation entity 136. A certain frequency band in a certain frame of the frequency-domain input audio signals 133-*m* may be referred to as a time-frequency tile. In the following, a time frequency tile in frequency sub-band k in the in the frequency-domain input audio signal 133-*m* is (also) denoted by X(k, m). In other examples, no decomposition to frequency sub-bands is applied, thereby processing the input audio signal 111 as a single frequency band.

The frequency domain audio signals 133-*m* are provided to the direction analysis entity 134 for spatial analysis therein, to the gain estimation entity 136 for estimation of gains g(k) therein, and to a spatial synthesis entity 138 for derivation of the of frequency-domain output audio signals 139-*n* (that are represented in the example of FIG. 2 by a multi-channel frequency-domain output audio signal 139) therein.

The spatial audio analysis in the direction estimation entity 134 serves to extract spatial audio parameters that are descriptive of the sound field captured in the input audio signals 111-*m*. In this regard, the extracted spatial audio parameters may be such that they are useable both for synthesis of the frequency-domain output audio signals 139-*n* and derivation of the gains g(k). In this regard, the spatial audio parameters may include at least the following parameter for each time-frequency tile:

- a direction of arrival (DOA), defined by an azimuth angle and/or an elevation angle derived on basis of the frequency-domain input audio signals 133-*m* in the respective time-frequency tile; and
- a direct-to-ambient ratio (DAR) derived at least in part on basis of coherence between the frequency-domain input audio signals 133-*m* in the respective time-frequency tile.

The DOA may be derived e.g. on basis of time differences between two or more frequency-domain input audio signals 133-*m* that represent the same sound(s) and that are captured using respective microphones 110*m* having known positions with respect to each other. The DAR may be derived e.g. on basis of coherence between pairs of frequency-domain input audio signals 133-*m* and stability of DOAs in the respective time-frequency tile. In general, the DOA and the DAR are spatial audio parameters known in the art and they may be derived by using any suitable technique known in the art. An exemplifying technique for deriving the DOA and the DAR is described in WO 2017/005978. The spatial audio analysis may optionally involve derivation of one or more further spatial audio parameters for at least some of the time-frequency tiles.

The sound field represented by the input audio signals 111-*m* and hence by the frequency-domain input audio signals 133-*m* may be considered to comprise a directional sound component and an ambient sound component, where the directional sound component represents one or more directional sound sources that each have a respective certain position in the sound field and where the ambient sound component represents non-directional sounds in the sound field. The spatial synthesis entity 138 operates to process the frequency-domain input audio signals 133-*m* into the frequency-domain output audio signals 139-*n* such that the frequency-domain output audio signals 139-*n* represent or at least approximate the sound field represented by the input audio signals 111-*m* (and hence in the frequency-domain input audio signals 133-*m*) in view of the predefined loudspeaker layout.

The processing of the frequency-domain input audio signals 133-*m* into the frequency-domain output audio signals 139-*n* may be carried out using various techniques. In an example, the frequency-domain output audio signals 139-*n* are derived directly from the frequency-domain input audio signals 133-*m*. The derivation of the frequency-domain output audio signals 139-*n* may involve, for example, deriving each of the frequency-domain output audio signals 139-*n* as a respective linear combination of two or more frequency-domain input audio signals 133-*m*, where one or more of the frequency-domain input audio signals 133-*m* involved in the linear combination may be time-shifted. In such an approach, for each frequency-domain output audio signal 139-*n* the weighting factors that define the respective linear combination and possible time-shifting involved therein may be selected on basis of the spatial audio parameters in view of the predefined loudspeaker layout. Such weighting factors may be referred to as panning gains, which panning gains may be available to the spatial synthesis entity 138 as predefined data stored in the spatial audio processing entity 130 or otherwise made accessible for the spatial synthesis entity 138.

In another example, the processing of the frequency-domain input audio signals 133-*m* into the frequency-domain output audio signals is carried out via one or more intermediate signals, wherein the one or more intermediate audio signals are derived on basis of the input audio signals 133-*m* and the frequency-domain output audio signals 139-*n* are derived on basis of the one or more intermediate audio signals. In such an approach, the one or more intermediate signals may be referred to as downmix signals. Derivation of an intermediate signal may involve, for example, selection of one of the frequency-domain input audio signals 133-*m* or a time-shifted version thereof as the respective intermediate signal or deriving the respective intermediate signal as a respective linear combination of two or more frequency-domain input audio signals 133-*m*, where one or more of the frequency-domain input audio signals 133-*m* involved in the linear combination may be time-shifted. Derivation of the intermediate audio signals may be carried out in dependence of the spatial audio parameters, e.g. DOA and DAR, extracted from the frequency-domain input audio signals 133-*m*. Derivation of the frequency-domain output audio signals 139-*n* on basis of the one or more intermediate audio signals may be carried out along the lines described above for deriving the frequency-domain output audio signals 139-*n* directly on basis of the frequency-domain input audio signals 133-*m*, mutatis mutandis.

In a scenario where the spatial synthesis is provided via the intermediate audio signal(s), in an example the processing that converts the frequency-domain input audio signals 133-*m* into the one or more intermediate audio signals may be carried out by the spatial synthesis entity 138. In another example, the intermediate audio signals may be derived from the frequency-domain input audio signals 133-*m* by a (logically) separate processing entity, which provides the intermediate audio signal(s) to the gain estimation entity 136 to serve as basis for estimation of gains g(k) therein and to the spatial synthesis entity 138 for derivation of the of frequency-domain output audio signals 139-*n* therein.

As an example of spatial synthesis via the intermediate audio signals, each of the directional sound component and the ambient sound component may be represented by a respective intermediate audio signal, which intermediate audio signals serve as basis for generating the frequency-domain output audio signals 139-*n*. An example in this regard involves processing the frequency-domain input audio signals 133-*m* into a first intermediate signal that (at least predominantly) represents the one or more directional sound sources of the sound field and one or more secondary intermediate signals that (at least predominantly) represent the ambience of the sound field, whereas each of the frequency-domain output audio signals 139-*m* may be derived as a respective linear combination of the first intermediate signal and at least one secondary intermediate signal.

Without losing generality, in such an example the first intermediate signal may be referred to as a mid signal $X_M$ and the one or more secondary intermediate signals may be referred to as one or more side signals $X_{S,n}$, where a mid signal component in the frequency sub-band k may be denoted by $X_M(k)$ and the one or more side signal components in the frequency sub-band k may be denoted by $X_{S,n}(k)$. Moreover, a frequency-domain output audio signal component $X_n(k)$ in the frequency sub-band k may be derived as a linear combination of the mid signal component $X_M(k)$ and at least one of the side signal components $X_{S,n}(k)$ in the respective frequency sub-band. An example that involves the spatial synthesis entity 138 deriving the frequency-domain output audio signals 139-*n* on basis of the mid signal $X_M$ and the one or more side signals $X_{S,n}$ is described in more detail later in this text.

For derivation of the mid signal $X_M$, for each time-frequency tile a subset of the frequency-domain input audio signals 133-*m* is selected for derivation of a respective mid signal component $X_M(k)$. The selection is made in dependence of the DOA derived for the respective time-frequency tile, for example such that a predefined number of frequency-domain input audio signals 133-*m* (e.g. three) obtained from respective microphones 110-*m* that are closest to the DOA in the respective time-frequency tile are selected. Among the selected frequency-domain input audio signals 133-*m* the one originating from the microphone 110-*m* that is closest to the DOA in the respective time-frequency tile is selected as a reference signal and the other selected frequency-domain input audio signals 133-*m* are time-aligned with the reference signal. The mid signal component $X_M(k)$ for the respective time-frequency tile is derived as a combination (e.g. a linear combination) of the time-aligned versions of the selected frequency-domain input audio signals 133-*m* in the respective time-frequency tile. In an example, the combination is provided as a sum or as an average of the selected (time-aligned) frequency-domain input audio signals 133-*m* in the respective time-frequency tile. In another example, the combination is provided as a weighted sum of the selected (time-aligned) frequency-domain input audio signals 133-*m* in the respective time-frequency tile such that a weight assigned for a given selected frequency-domain input audio signal 133-*m* is inversely proportional to the distance between DOA and the position of the microphone 111-*m* from which the given selected frequency-domain input audio signal 133-*m* is obtained. The weights are typically selected or scaled such that their sum is equal or approximately equal to unity. The weighting may facilitate avoiding audible artefacts in the output audio signals 131-*n* in a scenario where the DOA changes from frame to frame.

For derivation of the side signals $X_{S,n}$ according to an example, a preliminary side signal $X_S$ may be derived to serve as basis for deriving the side signals $X_{S,n}$. In an example in this regard, for each time-frequency tile all input audio signals 111-*m* are considered for derivation of a respective preliminary side signal component $X_S(k)$. The preliminary side signal component $X_S(k)$ for the respective time-frequency tile may be derived as a combination (e.g. a linear combination) of the frequency-domain input audio signals 133-*m* in the respective time-frequency tile. In an example, the combination is provided as a weighted sum of the frequency-domain input audio signals 133-*m* in the respective time-frequency tile such that the weights are assigned an adaptive manner, e.g. such that the weight assigned for a given frequency-domain input audio signal 133-*m* in a given time-frequency tile is inversely proportional to the DAR derived for the given frequency-domain input audio signal 133-*m* in the respective time-frequency tile. The weights are typically selected or scaled such that their sum is equal or approximately equal to unity. The side signal components $X_{S,n}(k)$ may be derived on basis of the preliminary side signal $X_S$ by applying respective decorrelation processing to the side signal $X_S$. In this regard, there may be a respective predefined decorrelation filter for each of the side signals $X_{S,n}$ (and for each of frequency sub-bands), and the side signal component $X_{S,n}(k)$ may be provided by processing each preliminary side signal component $X_S(k)$ with the respective predefined decorrelation filter.

In a variation of the above example for deriving the side signals $X_{S,n}$, the preliminary side signal $X_S$ is used as a sole side signal, whereas the decorrelation processing described above is applied by the spatial synthesis entity 138 upon creating respective ambient components for the frequency-domain output audio signals 139-*n*. In another example, the side signals $X_{S,n}$ may be obtained directly from the frequency-domain input audio signals 133-*m*, e.g. such that different one of the frequency-domain input audio signals 133-*m* (or a derivative thereof) is provided for each different side signal $X_{S,n}$. In a variation of this example, the side signals $X_{S,n}$ provided as (or derived from) different frequency-domain input audio signals 133-*m* are further subjected to the decorrelation processing described in the foregoing.

The gain estimation entity 136 operates to compute respective gains g(k) on basis of the spatial audio parameters obtained from the direction analysis entity 134 that enable controlling level in the frequency-domain output audio signals 139-*n*, where the gains g(k) are useable for adjusting sound reproduction gain in at least one of the channels of the multi-channel output audio signal 131, e.g. by adjusting the signal level in at least one of the frequency-domain output audio signals 139-*n*. In this regard, a dedicated gain g(k) may be computed for each of the frequency sub-bands k, where the gain g(k) is useable for multiplying frequency-domain output audio signal components $X_n(k)$ in the respective frequency sub-band in order to ensure providing the respective frequency-domain output audio signal 139-*n* at a signal level that makes good use of the available dynamic range, such that both unnecessary headroom and audio clipping are avoided. The gain estimation entity 136 re-uses the spatial audio parameters, e.g. DOAs and DARs that are extracted for derivation of the frequency-domain output audio signals 139-*n* by the spatial synthesis entity 138, thereby enabling level control of the frequency-domain output audio signals 139-*n* at a very low additional computational burden while no additional delay in synthesis of the frequency-domain output audio signals 139-*n* is provided.

As a reference scenario, we may consider derivation of the gains g(k) on basis of signal energy of the entire sound field across the output signals 131-*n*. The signal energy of the entire sound field $E_{SF}(k)$ in the frequency sub-band k may be estimated as the sum of energies across the frequency-domain input audio signals 133-*m*, e.g. as $$E_{SF}(k)=\Sigma_m X^2(k,m). \tag{1}$$

If now considering energy distribution in the frequency sub-band k across the frequency-domain output audio signals 139-*n* without consideration of spatial distribution of energy in the sound field, two extreme cases can be identified. In one end of the scale, the energy of the sound field is distributed evenly across the frequency-domain output audio signals 139-*n*, e.g.

$$E_{LS}(k,n)=E_{SF}(k)/N. \tag{2}$$

In the other end of the scale, the energy of the sound field is concentrated in a single frequency-domain output audio signal 139-*n*, e.g.

$$E_{LS}(k,n_1)=E_{SF}(k),\text{ and} \tag{3a}$$

$$E_{LS}(k,n_j)=0,j\neq 1. \tag{3b}$$

On the other hand, a value for the gain g(k) for the frequency sub-band k may be set as a function of energies across the frequency-domain output audio signals 139-*n* in the frequency sub-band k, e.g. as $$g(k)=f\left(\max_n E_{LS}(k,n)\right). \tag{4}$$

Figure 3:
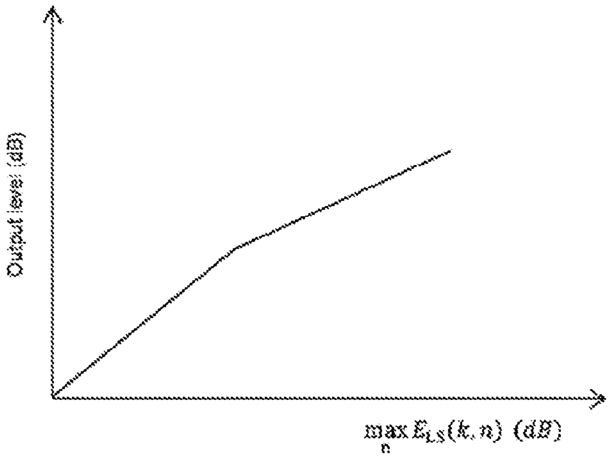
FIG. 3 illustrates mapping between maximum energy and output signal level according to an example.

FIG. 3 illustrates an exemplifying curve that conceptually defines the desired level in the frequency-domain output audio signals 139-*n* as a function of $$\max_n E_{LS}(k,n).$$

While the curve of FIG. 3 depicts an increasing piecewise linear function consisting of two sections, in other examples a piecewise linear increasing function with more than two sections may be employed. In order to ensure limiting the gain g(k) at higher signal energies, (apart from the first section) the slope of each section of the function is lower than that of the preceding (lower) sections of the curve. In other words, the linear sections of the piecewise linear function are arranged such that the slope of the curve in a section decreases with increasing value of $$\max_n E_{LS}(k,n),$$

thereby resulting in the gain g(k) with a value that is constant at low input audio signal energy levels but that is decreased at higher input audio signal energy levels to facilitate avoidance of audio clipping.

Depending on the distribution of the input energy, there is a 10 log N dB difference in the energy $$\max_n E_{LS}(k,n)$$

between scenarios where the sound field energy is evenly distributed across the frequency-domain output audio signals 139-*n* and concentration of the sound field energy in a single frequency-domain output audio signal 139-*n*: for example if there are 7 loudspeakers in the predefined loudspeaker layout, the difference is approx. 8.5 dB, whereas in case of 22 loudspeakers the difference is approx. 13.4 dB. Consequently, if the gain g(k) is selected based on the sound field energy concentrated in the single frequency-domain output audio signal 139-*n*, there is a large excess headroom if the spatial synthesis entity 138 actually distributes the energy evenly across the frequency-domain output audio signals 139-*n* (i.e. approx. 8.5 dB for the example 7-channel layout and approx. 13.4 dB for the example 22-channel layout). In contrast, if the gain g(k) is selected based on even distribution of the sound field energy across the frequency-domain output audio signals 139-*n*, audio clipping to an large extent is encountered if the spatial synthesis entity 138 actually concentrates the sound field energy to a single frequency-domain output audio signal 139-*n*. In scenario between these two extreme ones, some excess headroom and audio clipping to some extent can be expected.

In order to reduce the excess headroom without causing a serious risk of audio clipping or, vice versa, to ensure that no audio clipping occurs without causing a serious risk for excess headroom, the gain estimation entity 136 operates to select values for the gains g(k) in consideration of the DOAs and DARs obtained for the respective frequency sub-band. In the following, the DOA for the frequency sub-band k is denoted by θ(k) and the DAR for the frequency sub-band k is denoted by r(k).

As described in the foregoing, the spatial synthesis entity 138 may derive each of the frequency-domain output audio signals 139-*n* on basis of the frequency-domain input audio signals 133-*m* or from one or more intermediate audio signals derived from the input audio signals 133-*m* in dependence of the spatial audio parameters and in view of the applied loudspeaker layout. In particular, the frequency-domain output signals 139-*n* may be derived in dependence of the DOAs θ(k) and the DARs r(k). Regardless of the manner of deriving the frequency-domain output signals 139-*n*, we may consider energy distribution arising from such derivation of the frequency sub-band k of the frequency-domain output audio signal 139-*n* separately for the ambient sound component and for the directional sound component: the energy of the ambient sound component of the sound field is distributed across the frequency-domain output audio signals 139-*n* according to $$E_{LS,A}(k,n)=(1-r(k))E_{SF}(k)/N. \tag{5}$$

In other words, the fraction of the signal energy in the sound field in the frequency sub-band k that represents ambient sound component is defined via the direct-to-ambient ratio r(k) obtained for the respective frequency sub-band and the ambient energy in the frequency sub-band k gets distributed evenly across the frequency-domain output audio signals 139-*n*. Also the energy of the directional sound component of the sound field gets distributed to the frequency-domain output audio signals 139-*n* in accordance with the direct-to-ambient ratio r(k) by $$E_{LS,D}(k,n_1)=r(k)a_1(k)E_{SF}(k), \tag{6a}$$

$$E_{LS,D}(k,n_2)=r(k)a_2(k)E_{SF}(k),\text{ and} \tag{6b}$$

$$E_{LS,D}(k,n_j)=0,j\neq 1,2. \tag{6c}$$

In other words, the fraction of the signal energy of the sound field that represents energy of the directional sound component(s) in the sound field in the frequency sub-band k is defined by the direct-to-ambient ratio r(k) obtained for the respective frequency sub-band and it is distributed to the two frequency-domain output audio signals 139-$n_1$ and 139-$n_2$ in accordance with panning gains $a_1(k)$ and $a_2(k)$, respectively. The two frequency-domain output audio signals 139-$n_1$ and 139-$n_2$ that serve to convey the directional sound component energy may be any two of the N frequency-domain output audio signals 139-*n*, whereas the panning gains $a_1(k)$ and $a_2(k)$ are allocated a value between 0 and 1. The frequency-domain output audio signals 139-$n_1$ and 139-$n_2$ and the panning gains $a_1(k)$ and $a_2(k)$ are also derived by a panning algorithm in dependence of the DOA θ(k) obtained for the respective frequency sub-band in view of the predefined loudspeaker layout. Using exactly two panning gains $a_1(k)$ and $a_2(k)$ is a non-limiting example chosen for clarity and brevity of description, while in other examples a respective panning gain $a_j(k)$ may be derived for more than two frequency-domain output audio signals 139-$n_j$, up to N panning gains and frequency-domain output audio signals 139-$n_j$. The panning algorithm may comprise e.g. vector base amplitude panning (VBAP) described in detail in Pulkki, V., "*Virtual source positioning using vector base amplitude panning*", Journal of Audio Engineering Society, vol. 45, pp. 456-466, June 1997.

In order to select respective values for the panning gains $a_1(k)$ and $a_2(k)$, the gain estimation entity 136 (or storage means coupled thereto) may store a predefined panning lookup table for the predefined loudspeaker layout, where the panning lookup table stores a respective table entry for a plurality of DOAs θ, where each table entry includes the DOA θ together with following information assigned to this DOA θ:

- respective values for the panning gains $a_j(k)$, and
- channel mapping information that identifies the frequency-domain output audio signals 139-*n* (e.g. channels of the multi-channel output signal 131) to which the panning gain values $a_j(k)$ of this table entry apply.

The gain estimation entity 136 searches the panning lookup table to identify a table entry that includes a DOA θ that is closest to the observed or estimated DOA θ(k), uses the panning gain values of the identified table entry for the panning gains $a_j(k)$, and uses the channel mapping information of the identified table entry as identification of the frequency-domain output audio signals 139-$n_j$.

Hence, with the knowledge of the DOA θ(k) and the direct-to-ambient ratio r(k) for the frequency sub-band k, the gain estimation entity 136 may estimate sound field energy distribution to the frequency-domain output audio signals 139-*n* by combining the energy possibly originating from the directional sound component of the sound field and the energy originating from the ambient signal component e.g. by $$E_{LS}(k,n_1)=r(k)a_1(k)E_{SF}(k)+(1-r(k))E_{SF}(k)/N, \quad (7a)$$

$$E_{LS}(k,n_2)=r(k)a_2(k)E_{SF}(k)+(1-r(k))E_{SF}(k)/N, \quad (7b)$$

$$E_{LS}(k,n_j)=(1-r(k))E_{SF}(k)/N, j\neq 1,2. \quad (7c)$$

Herein, the equation (7a) is the sum of the equations (6a) and (5), the equation (7b) is the sum of the equations (6b) and (5), and the equation (7c) is the sum of the equations (6c) and (5). Although the equations (7a) to (7c) relate to an example of exactly two panning gains a1 k and a2k, this example readily generalizes into scenario with two or more panning gains $a_j(k)$ along the lines described in the foregoing.

The gain estimation entity 136 may obtain the value of the gain g(k) according to the equation (4), for example by using a predefined gain lookup table that defines a mapping from a maximum energy $E_{max}$ to a value for the gain g(k) for a plurality of pairs of $E_{max}$ and g(k) e.g. according to the example curve shown in FIG. 3 or according to another predefined curve (along the lines described in the foregoing). Such gain lookup table may store a respective table entry for a plurality of maximum energies $E_{max}$, where each table entry includes an indication of the maximum energy $E_{max}$ together with a value for the gain g(k) assigned to this maximum energy $E_{max}$. The gain estimation entity 136 searches the gain lookup table to identify a table entry that includes a maximum energy $E_{max}$ that is closest to the estimated maximum energy $$\max_n E_{LS}(k, n)$$

and uses the gain value of the identified table entry as the value of the gain g(k).

Such selection of the value for the gain g(k) takes into account the energy distribution across the frequency-domain output audio signals 139-*n* as estimated via the equations (7a) to (7c) instead of basing the value-setting on the energy levels computed using the equations (2), (3a) and (3b), the selection of the value for the gain g(k) thereby tracking the actual energy distribution across channels of the multi-channel output audio signal 131, thereby enabling both avoidance of unnecessary headroom and audio clipping.

Figure 4:
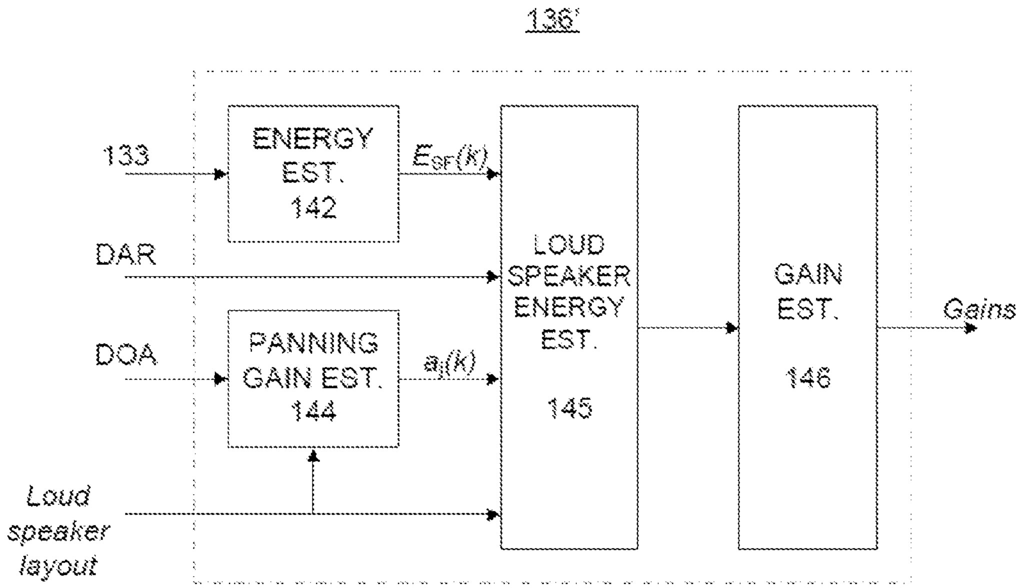
FIG. 4 illustrates a block diagram of some components and/or entities of a gain estimation entity according to an example.

To further illustrate operations involved in deriving the values for the gains g(k), FIG. 4 illustrates a block diagram of some components and/or entities of a gain estimation entity 136' according to an example, while the gain estimation entity 136' may include further components and/or entities in addition to those depicted in FIG. 4. The gain estimation entity 136' may operate as the gain estimation entity 136. An energy estimator 142 receives the frequency-domain input audio signals 133-*m* (or one or more intermediate audio signals derived from the frequency-domain input audio signals 133-*m*) and computes the signal energy of the sound field on basis of the received signals, e.g. according to the equation (1). A panning gain estimator 144 receives the DOAs θ(k) and obtains the panning gains $a_j(k)$ and the associated channel mapping information in dependence of the DOAs θ(k) and in view of the loudspeaker layout e.g. by accessing the panning lookup table, as described in the foregoing. In other examples, the panning gain estimator 144 may be provided as a (logical) entity that is separate from the gain estimation entity 136', e.g. as a dedicated entity that serves the gain estimation entity 136' and one or more further entities (e.g. the spatial synthesis entity 138) or as an element of the spatial synthesis entity 138 where it also operates to derive the panning gains for the gain estimation entity 136'.

A loudspeaker energy estimator 145 receives an indication of the signal energy derived by the energy estimator 142, the panning gains $a_j(k)$ (and the associated channel mapping) obtained by the panning gain estimator and the DARs r(k) and estimates respective output signal energies of the frequency-domain output audio signals 139-*m* (that represent channels of multi-channel output audio signal 131) based on the signal energy of the sound field and the spatial audio parameters in accordance with the predefined loudspeaker layout, e.g. based on the panning gains $a_j(k)$ derived by the panning gain estimator 144 on basis of the DOAs θ(k) and the DARs r(k).

The loudspeaker energy estimator 145 may carry out the out signal energy estimation e.g. according to the equations (7a), (7b) and (7c). A gain estimator 146 receives the estimated output signal energies, determines maximum thereof across the frequency-domain output audio signals 139-*m* (that represent channels of multi-channel output audio signal 131) and derives values for the gain g(k) as a predefined function of the maximum energy, e.g. according to the equation (4) and by using a predefined gain lookup table along the lines described in the foregoing.

Referring back to the spatial synthesis entity 138, the frequency-domain output audio signal component $X_n(k)$ in the frequency sub-band k may be derived as a linear combination of the frequency-domain input audio signals 131-*m* or as a linear combination of intermediate audio signals. As an example of the latter, the frequency-domain output audio signal component $X_n(k)$ in the frequency sub-band k may be derived as a linear combination of the mid signal component $X_M(k)$ and the side signal component $X_{S,n}(k)$ in the respective frequency sub-band by using the panning gains $a_j(k)$ (in this example, the panning gains $a_1(k)$, $a_2(k)$) and the gain g(k) for example as follows:

$$X_{n_1}(k)=g(k)(r(k)a_1(k)X_M(k)+(1-r(k))X_{S,n_1}(k)/N), \tag{8a}$$

$$X_{n_2}(k)=g(k)(r(k)a_2(k)X_M(k)+(1-r(k))X_{S,n_2}(k)/N), \tag{8b}$$

$$X_{n_j}(k)=g(k)(1-r(k))X_{S,n_j}(k)/N, j\neq 1,2. \tag{8c}$$

Figure 5:
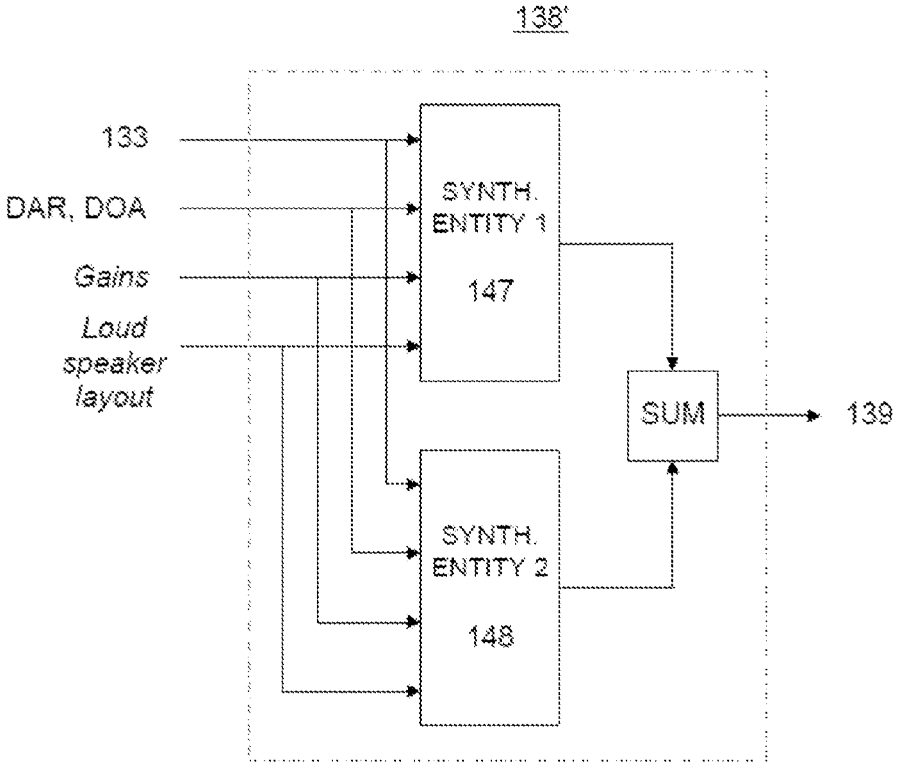
FIG. 5 illustrates a block diagram of some components and/or entities of a spatial synthesis entity according to an example.

To further illustrate operations involved in synthesizing the frequency-domain output audio signals 139-*n*, FIG. 5 illustrates a block diagram of some components and/or entities of a spatial synthesis entity 138' according to an example, while the spatial synthesis entity 138' may include further components and/or entities in addition to those depicted in FIG. 5. The spatial synthesis entity 138' may operate as the spatial synthesis entity 138. The spatial synthesis entity 138' comprises a first synthesis entity 147 for synthesizing a directional sound component, a second synthesis entity 148 for synthesizing an ambient sound component, and a sum element for combining the synthesized directional sound component and the synthesized ambient component into the frequency-domain output audio signals 139-*n*. The synthesis in the first and second synthesis entities 147, 148 is carried out on basis of the frequency-domain input audio signals 133-*m* in dependence of the spatial audio parameters (such as the DARs and the DOAs described in the foregoing) and the gains g(k) in view of the predefined loudspeaker layout.

In an example, the spatial synthesis entity 138' may base the audio synthesis on the mid signal $X_M$ and the side signals $X_{S,n}$ that serve as intermediate audio signals that, respectively, represent the directional sound component and the ambient sound component of the sound field represented by the multi-channel input audio signal 111. In this regard, the spatial synthesis entity 138' may include a processing entity that operates to derive the mid signal $X_M$ and the side signals $X_{S,n}$ on basis of the frequency-domain input audio signals 131-*m* in dependence of the spatial audio parameters (e.g. DOAs and DARs) as described in the foregoing. Alternatively, the audio input the spatial synthesis entity 138' may comprise the mid signal $X_M$ and the side signals $X_{S,n}$ (or the preliminary side signal $X_S$) instead of the frequency-domain input audio signals 133-*m*). As another alternative, the first synthesis entity 147 may provide procedures for deriving the mid signal $X_M$ on basis of the frequency-domain input audio signals 133-*m* in dependence of the spatial parameters (e.g. DOAs and DARs) and the second synthesis entity 148 may provide procedures for deriving the side signals $X_{S,n}$ on basis of the frequency-domain input audio signals 133-*m* in dependence of the spatial parameters (e.g. DARs).

Moreover, the first synthesis entity 147 may further include a panning gain estimator that operates to derive the panning gains $a_j(k)$ as described in context of the panning gain estimator 144 in the foregoing. Consequently, the synthesized directional sound component may be derived e.g. as $$X_{D,n_1}(k)=g(k)r(k)a_1(k)X_M(k), \tag{9a}$$

$$X_{D,n_2}(k)=g(k)r(k)a_2(k)X_M(k), \text{ and} \tag{9b}$$

$$X_{D,n_j}(k)=0, j\neq 1,2, \tag{9c}$$

where $X_{D,nj}(k)$ denotes the synthesized directional sound component for the frequency-domain output signal 139-$n_j$ in the frequency sub-band k. The synthesized ambient component may derived e.g. as $$X_{A,n}(k)=g(k)(1-r(k))X_{S,n}(k)/N, \tag{10}$$

where $X_{A,n}(k)$ denotes the synthesized ambient sound component for the frequency-domain output signal 139-*n* in the frequency sub-band k. The frequency-domain output audio signal 139-*n* in the frequency sub-band k may be obtained as a sum of the synthesized directional sound component $X_{D,nj}(k)$ and the synthesized ambient component $X_{A,n}(k)$.

While the example provided by the equations (8a) to (8c), (9a), (9b) and (10) employs the gain g(k) for each of the frequency-domain output audio signals 139-*n*, in other examples only one of the frequency-domain output audio signals 139-*n* or a certain limited subset of the frequency-domain output audio signals 139-*n* may be scaled by the gain g(k). In these exemplifying variations, for those frequency-domain output audio signals 139-*n* for which the gain g(k) is not applied, the gain g(k) may be replaced by a predefined scaling factor, typically having value one or close to one. As an example in this regard, the derived value of the gain g(k) may be applied for adjusting sound reproduction level of the directional sound component whereas the gain g(k) may be ignored in derivation of the ambient sound component, for example by using the derived value of g(k) for scaling the signal level according to the equations (9a) and (9b) while using g(k)=1 in the equation (10). In another example in this regard, assuming the 5.1-channel loudspeaker layout, the signal level may be adjusted by using the derived value of the gain g(k) in those frequency-domain output audio signals 139-*n* that correspond to the front left, front right, center, surround left and surround right channels, whereas for the frequency-domain output audio signal 139-*n* that corresponds to the LFE (low-frequency effects) channel g(k)=1 may be applied.

The spatial synthesis entity 138 combines the frequency-domain output audio signal components $X_n(k)$ across the K frequency sub-bands to form the respective frequency-domain output audio signal 139-*n* for provision to an inverse transform entity 140 for frequency-to-time-domain transform therein. The inverse transform entity 140 serves to carry out an inverse transform to convert the frequency-domain output audio signals 139-*n* into respective time-domain output audio signals 131-*n*, which may be provided e.g. to the loudspeakers 150 for rendering of the sound field captured therein. The inverse transform entity 140 hence operates to 'reverse' the time-to-frequency-domain transform carried out by the transform entity 132 by using an inverse transform procedure matching the transform procedure employed by the transform entity 132. In an example where the transform entity 132 employs STFT, the inverse transform entity employs an inverse STFT (ISTFT).

In the foregoing, an implicit assumption is that the direction analysis entity 134, the gain estimation entity 136 and the spatial synthesis entity 138 are co-located elements that may provide as a single entity or device. This, however, is a non-limiting example and in certain scenarios different distribution of the direction analysis entity 134, the gain estimation entity 136 and the spatial synthesis entity 138 may be applied. As an example, the direction analysis entity 134 may be provided in a first entity or device whereas the gain estimation entity 136 and the spatial synthesis entity 138 are provided in a second entity or device that is separate from the first entity or device. In such an approach, the first entity or device may operate to provide the multi-channel input audio signal 111 or a derivative thereof (e.g. the mid signal $X_M$ and the one or more side signals $X_{S,n}$ described in the foregoing) together with the spatial audio parameters (e.g. the DOAs and DARs) and transfers this information over a communication channel (e.g. audio streaming) or as data stored in a memory device to the second entity or device, which operates to carry out estimation of the gains g(k) and spatial synthesis to create the multi-channel output audio signal 131 on basis of the information extracted and provided by the first entity or device.

Figure 6:
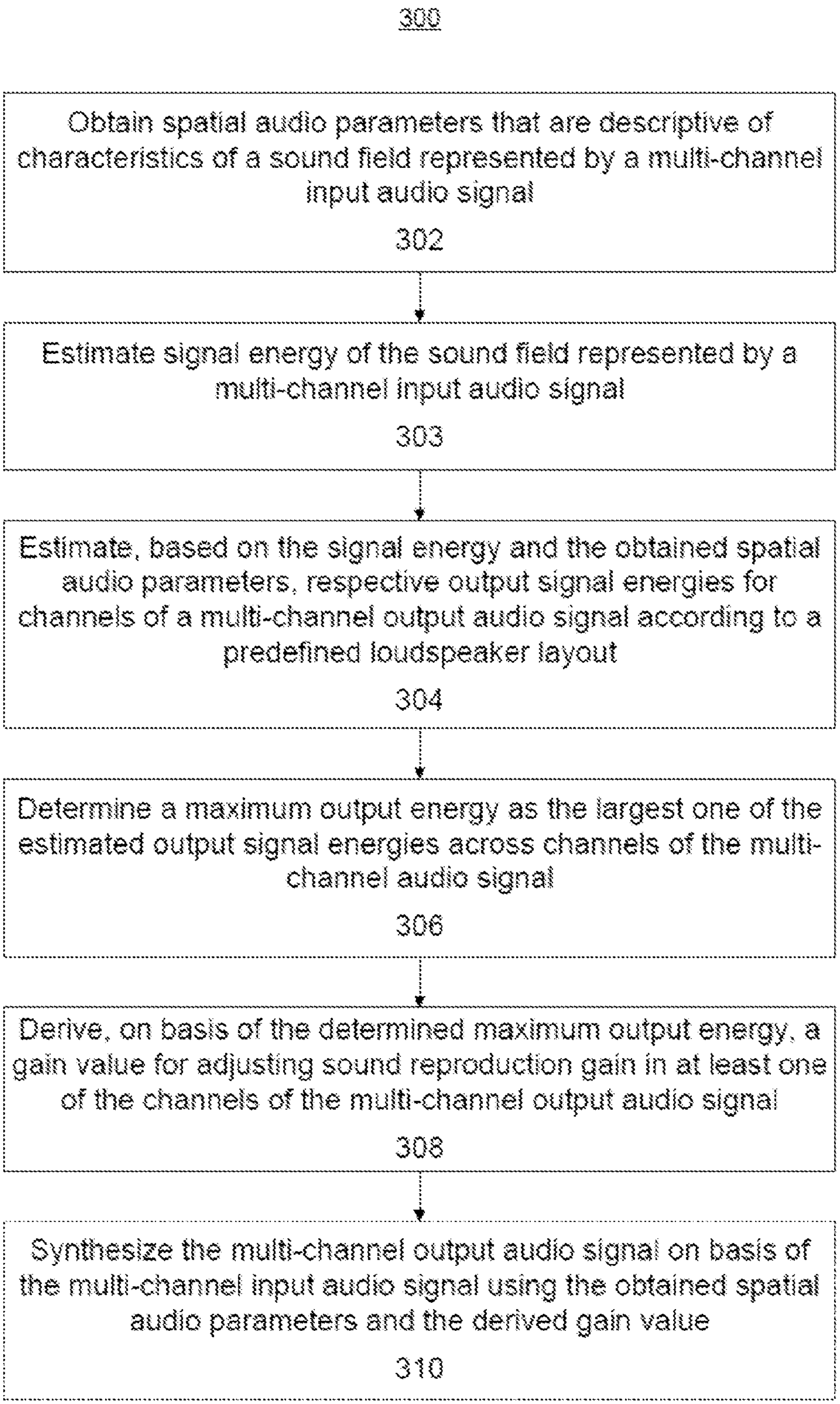
FIG. 6 illustrates a method according to an example.

While in the foregoing various aspects pertaining to the operation of the spatial audio processing entity 130 has been described with references to its functional blocks or entities, the spatial audio processing technique provided by the spatial audio processing entity may 130 may be, alternatively, described as steps of a method. As a non-limiting example in this regard, at least part of the functionalities of the direction analysis entity 134, the gain estimation entity 136 and the spatial synthesis entity 138 to generate the frequency-domain output audio signals 139-*n* on basis of the frequency-domain input audio signals 133-*m* in view of the predefined loudspeaker layout is outlined by steps of a method 300 depicted by the flow diagram of FIG. 6.

The method 300 serves to facilitate processing a multi-channel input audio signal representing a sound field into a multi-channel output audio signal representing the same sound field in accordance with a predefined loudspeaker layout. As described in the foregoing in context of the spatial audio processing entity 130, the processing may be carried out separately for a plurality of frequency sub-bands, while the flow diagram of FIG. 6 describes, for clarity and brevity of description, the steps of the method 300 for a single frequency sub-band. However, the generalization to multiple frequency sub-bands is readily implicit in view of the foregoing.

The method 300 commences by obtaining spatial audio parameters that are descriptive of characteristics of said sound field represented by the multi-channel input audio signal 111, as indicted in block 302. The method 300 proceeds to estimating the signal energy of the sound field represented by the multi-channel input audio signal 111, as indicated in block 303. The method 300 further proceeds to estimating, based on the signal energy of the sound field and the obtained spatial audio parameters, respective output signal energies for channels of the multi-channel output audio signal 131 according to the predefined loudspeaker layout, as indicated in block 304.

The method 300 further proceeds to determining a maximum output energy as the largest one of the estimated output signal energies across channels of the multi-channel output audio signal 131, as indicated in block 306, and to deriving, on basis of the determined maximum output energy, the gain value g(k) for adjusting sound reproduction gain in at least one of the channels of the multi-channel output audio signal 131, as indicated in block 308. Along the lines described in the foregoing, in an example derivation of the gain value g(k) comprises deriving the gain value g(k) as a predefined function of the determined maximum output energy, whereas according to an example the predefined function models an increasing piece-wise linear function of two or more linear sections, where the slope of each section is smaller than that of the lower sections.

The gain value g(k) obtained from operation of the block 308 may be applied in synthesis of the multi-channel spatial audio signal 131 on basis of the multi-channel input audio signal 111 using the spatial audio parameters and the derived gain value g(k), as indicated in block 310. In an example, the synthesis of block 310 involves deriving a respective output channel signal for each channel of the multi-channel output audio signal on basis of respective audio signals in one or more channels of the multi-channel input audio signal in dependence of the spatial audio parameters, wherein said derivation comprises adjusting signal level of at least one of the output channel signals by the derived gain value.

Figure 7:
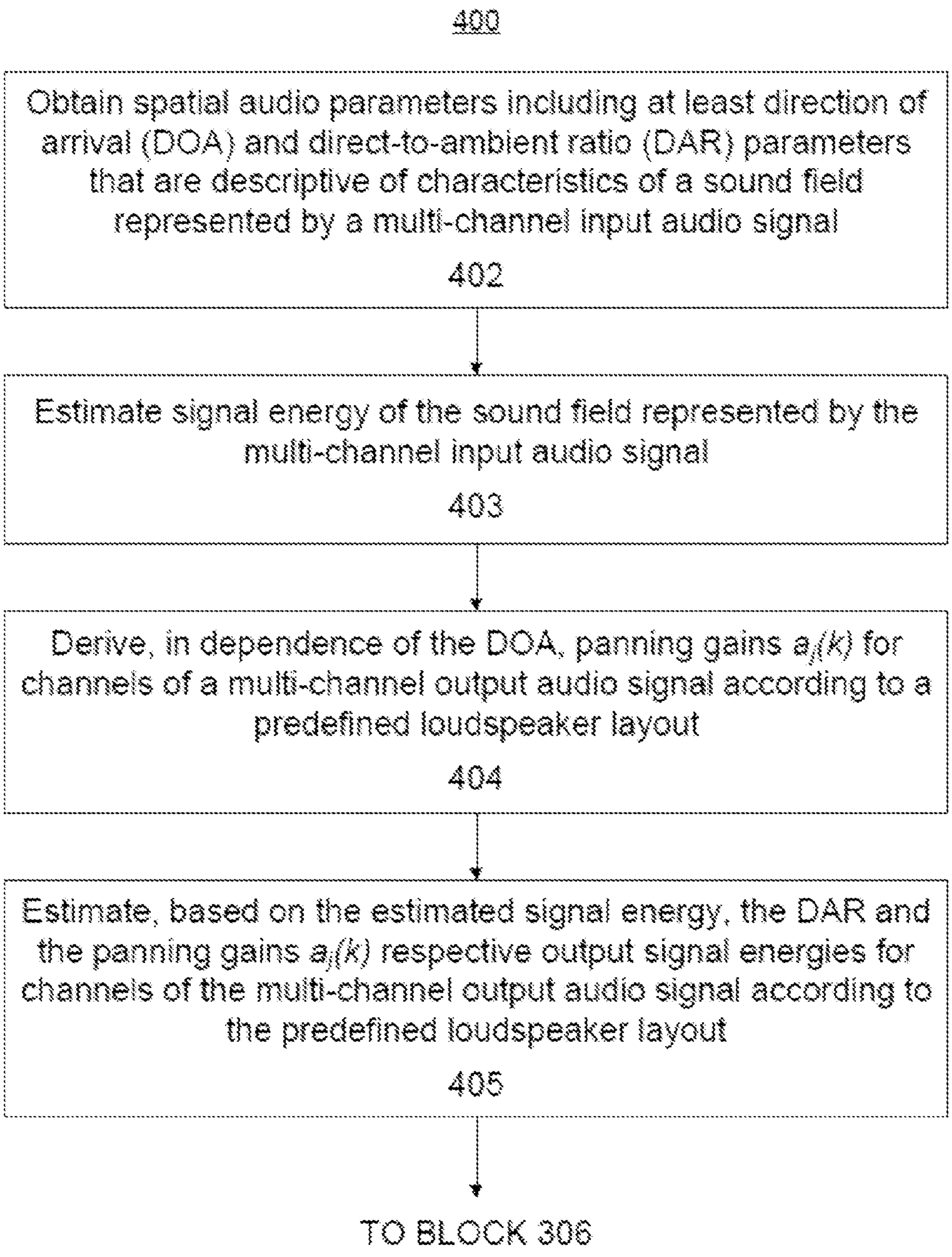
FIG. 7 illustrates a method according to an example.

The method 300 may be varied and/or complemented in a number of ways, for example according to the examples that describe respective aspects of operation of the spatial audio processing entity 130 in the foregoing. As an example in this regard, FIG. 7 depicts a flow diagram that illustrates examples of operations pertaining to blocks 302 to 304 of the method 300. The method 400 commences by obtaining spatial audio parameters that are descriptive of characteristics of said sound field represented by the multi-channel input audio signal 111, the spatial audio parameters including at least the DOA and the DAR for a plurality of frequency sub-bands, as indicated in block 402. Characteristics of the DOA and DAR parameters are described in more detail in the foregoing.

The method 400 proceeds to estimating the signal energy of the sound field represented by the multi-channel input audio signal 111, as indicated in block 403. The method 400 further proceeds to deriving, in dependence of the DOA, respective panning gains $a_j(k)$ for at least two channels of the multi-channel output audio signal 131 in accordance with the predefined loudspeaker layout, as indicated in block 404. As described in the foregoing in context of the spatial audio processing entity 130, this may include obtaining respective panning gains $a_j(k)$ for at least two channels of the multi-channel output audio signal 131 in dependence of the DOA and respective indications of the at least two channels of the multi-channel output audio signal 131 to which the panning gains apply.

The method 400 further proceeds to estimating, based on the estimated signal energy of the sound field, the DAR and the panning gains $a_j(k)$, respective output signal energies for channels of the multi-channel output audio signal 131 in accordance with the predefined loudspeaker layout, as indicated in block 405. The output signal energy estimation may be carried out, for example, as described in the foregoing in context of the spatial audio processing entity 130. From block 405, the method 400 may proceed to carry out operations described in context of blocks 306 and 308 (and possibly block 310) described in the foregoing in context of the method 300.

Figure 8:
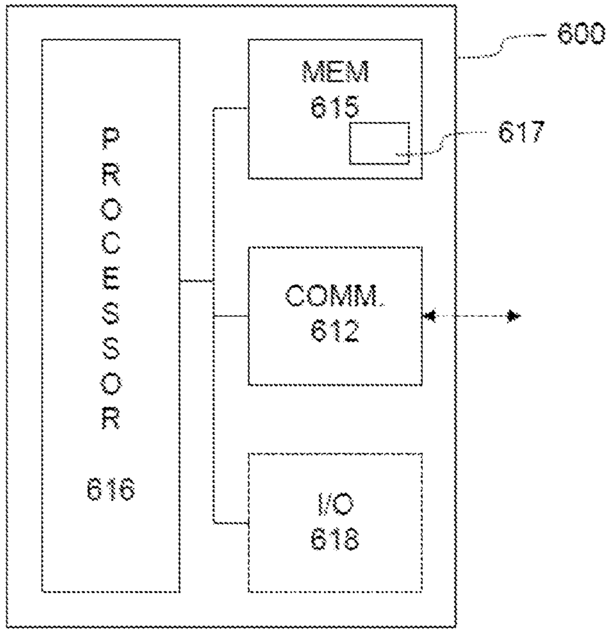
FIG. 8 illustrates a block diagram of some components and/or entities of an apparatus for spatial audio analysis according to an example.

FIG. 8 illustrates a block diagram of some components of an exemplifying apparatus 600. The apparatus 600 may comprise further components, elements or portions that are not depicted in FIG. 8. The apparatus 600 may be employed in implementing the spatial audio processing entity 130 or at least some components or elements thereof.

The apparatus 600 comprises a processor 616 and a memory 615 for storing data and computer program code 617. The memory 615 and a portion of the computer program code 617 stored therein may be further arranged to, with the processor 616, to implement operations, procedures and/or functions described in the foregoing in context of the spatial audio processing entity 130.

The apparatus 600 may comprise a communication portion 612 for communication with other devices. The communication portion 612 comprises at least one communication apparatus that enables wired or wireless communication with other apparatuses. A communication apparatus of the communication portion 612 may also be referred to as a respective communication means.

The apparatus 600 may further comprise user I/O (input/output) components 618 that may be arranged, possibly together with the processor 616 and a portion of the computer program code 617, to provide a user interface for receiving input from a user of the apparatus 600 and/or providing output to the user of the apparatus 600 to control at least some aspects of operation of the spatial audio processing entity 130 implemented by the apparatus 600. The user I/O components 618 may comprise hardware components such as a display, a touchscreen, a touchpad, a mouse, a keyboard, and/or an arrangement of one or more keys or buttons, etc. The user I/O components 618 may be also referred to as peripherals. The processor 616 may be arranged to control operation of the apparatus 600 e.g. in accordance with a portion of the computer program code 617 and possibly further in accordance with the user input received via the user I/O components 618 and/or in accordance with information received via the communication portion 612.

The apparatus 600 may comprise the audio capturing entity 110, e.g. a microphone array or microphone arrangement comprising the microphones 110-*m* that serve to record the input audio signals 111-*m* that constitute the multi-channel input audio signal 111.

Although the processor 616 is depicted as a single component, it may be implemented as one or more separate processing components. Similarly, although the memory 615 is depicted as a single component, it may be implemented as one or more separate components, some or all of which may be integrated/removable and/or may provide permanent/semi-permanent/dynamic/cached storage.

The computer program code 617 stored in the memory 615, may comprise computer-executable instructions that control one or more aspects of operation of the apparatus 600 when loaded into the processor 616. As an example, the computer-executable instructions may be provided as one or more sequences of one or more instructions. The processor 616 is able to load and execute the computer program code 617 by reading the one or more sequences of one or more instructions included therein from the memory 615. The one or more sequences of one or more instructions may be configured to, when executed by the processor 616, cause the apparatus 600 to carry out operations, procedures and/or functions described in the foregoing in context of the spatial audio processing entity 130.

Hence, the apparatus 600 may comprise at least one processor 616 and at least one memory 615 including the computer program code 617 for one or more programs, the at least one memory 615 and the computer program code 617 configured to, with the at least one processor 616, cause the apparatus 600 to perform operations, procedures and/or functions described in the foregoing in context of the spatial audio processing entity 130.

The computer programs stored in the memory 615 may be provided e.g. as a respective computer program product comprising at least one computer-readable non-transitory medium having the computer program code 617 stored thereon, the computer program code, when executed by the apparatus 600, causes the apparatus 600 at least to perform operations, procedures and/or functions described in the foregoing in context of the spatial audio processing entity 130. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Herein, reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

In the following, further illustrative and non-limiting example embodiments of the spatial audio processing technique described in the present disclosure are described.

According to an example embodiment, an apparatus for processing, in at least one frequency band, a multi-channel input audio signal representing a sound field into a multi-channel output audio signal representing said sound field in accordance with a predefined loudspeaker layout, the apparatus comprising means for obtaining spatial audio parameters that are descriptive of spatial characteristics of said sound field; means for estimating a signal energy of the sound field represented by the multi-channel input audio signal; means for estimating, based on said signal energy and the obtained spatial audio parameters, respective output signal energies for channels of the multi-channel output audio signal according to said predefined loudspeaker layout; means for determining a maximum output energy as the largest of the output signal energies across channels of said multi-channel output audio signal; and means for deriving, on basis of said maximum output energy, a gain value for adjusting sound reproduction gain in at least one of said channels of the multi-channel output audio signal.

According to another example embodiment, an apparatus for processing, in at least one frequency band, a multi-channel input audio signal representing a sound field into a multi-channel output audio signal representing said sound field in accordance with a predefined loudspeaker layout is provided, wherein the apparatus comprises at least one processor; and at least one memory including computer program code, which when executed by the at least one processor, causes the apparatus to: obtain spatial audio parameters that are descriptive of spatial characteristics of said sound field; estimate a signal energy of the sound field represented by the multi-channel input audio signal; estimate, based on said signal energy and the obtained spatial audio parameters, respective output signal energies for channels of the multi-channel output audio signal according to said predefined loudspeaker layout; determine a maximum output energy as the largest of the output signal energies across channels of said multi-channel output audio signal; and derive, on basis of said maximum output energy, a gain value for adjusting sound reproduction gain in at least one of said channels of the multi-channel output audio signal.

According to a further example embodiment, a computer program product for processing, in at least one frequency band, a multi-channel input audio signal representing a sound field into a multi-channel output audio signal representing said sound field in accordance with a predefined loudspeaker layout is provided, the computer program product comprising computer readable program code tangibly embodied on a non-transitory computer readable medium, the program code configured to cause performing at least the following when run a computing apparatus: obtain spatial audio parameters that are descriptive of spatial characteristics of said sound field; estimate a signal energy of the sound field represented by the multi-channel input audio signal; estimate, based on said signal energy and the obtained spatial audio parameters, respective output signal energies for channels of the multi-channel output audio signal according to said predefined loudspeaker layout; determine a maximum output energy as the largest of the output signal energies across channels of said multi-channel output audio signal; and derive, on basis of said maximum output energy, a gain value for adjusting sound reproduction gain in at least one of said channels of the multi-channel output audio signal.

In these example embodiments, the at least one frequency band may comprise a plurality of non-overlapping frequency sub-bands and the processing may be carried out separately for said plurality of non-overlapping frequency sub-bands.

Additionally or alternatively, in these example embodiments said spatial audio parameters may comprise the DOA and the DAR, and the processing for estimating the respective output signal energies for channels of the multi-channel output audio signal may include obtaining respective panning gains for at least two channels of the multi-channel output audio signal in dependence of the DOA and respective indications of the at least two channels of the multi-channel output audio signal to which the panning gains apply, and estimating distribution of the signal energy to channels of the multi-channel output audio signal on basis of said signal energy in accordance with the DAR and said panning gains. As an example in this regard, estimating distribution of the signal energy to channels of the multi-channel output audio signal may comprise computing channel energies by $$E_{LS}(k,n_1)=r(k)a_1(k)E_{SF}(k)+(1-r(k))E_{SF}(k)/N,$$

$$E_{LS}(k,n_2)=r(k)a_2(k)E_{SF}(k)+(1-r(k))E_{SF}(k)/N,$$

$$E_{LS}(k,n_j)=(1-r(k))E_{SF}(k)/N, j\neq 1,2,$$

wherein $E_{LS}(k,n)$ denotes energy in the frequency sub-band k for channel n, $E_{SF}(k)$ denotes the overall energy in the frequency sub-band k, r(k) denotes the DAR for the frequency sub-band k, $a_1(k)$ and $a_2(k)$ denote the panning gains for the frequency-band k, $n_1$ and $n_2$ denote the channels to which the panning gains $a_1(k)$ and $a_2(k)$, respectively, pertain, and N denotes the number of channels in the multi-channel spatial audio signal.

Additionally or alternatively, in these example embodiments, derivation of the gain value may comprise deriving the gain value as a predefined function of the determined maximum output energy. As an example in this regard, the predefined function may model an increasing piece-wise linear function of two or more linear sections, where the slope of each section is smaller than that of the lower sections. The predefined function may be provided by a predefined gain lookup table that defines a mapping between a maximum energy and a gain value for a plurality of pairs of maximum energy and gain value, and wherein deriving the gain value comprises identifying maximum energy of the gain lookup table that is closest to the said determined maximum energy, and selecting the gain value that according to the gain lookup table maps to the identified maximum energy of the gain lookup table.

These example embodiments may be varied and/or complemented in a number of ways, for example according to the examples that describe respective aspects of operation of the spatial audio processing entity 130 in the foregoing.

Throughout the present disclosure, although functions have been described with reference to certain features, those functions may be performable by other features whether described or not. Although features have been described with reference to certain embodiments, those features may also be present in other embodiments whether described or not.

The invention claimed is:

1. An apparatus configured to process a multi-channel input audio signal representing a sound field into a multi-channel output audio signal in accordance with a predefined loudspeaker layout, the apparatus comprising at least one processor; and at least one memory including computer program code, which when executed by the at least one processor, causes the apparatus to:

obtain spatial audio parameters associated with said sound field;

estimate a signal energy of the sound field, wherein estimating the signal energy of the sound field comprises determining a respective input signal energy for at least two channels of the multi-channel input audio signal; and selecting a maximum signal energy of the input signal energies;

estimate, based on said selected maximum signal energy and the obtained spatial audio parameters, respective output signal energies for channels of the multi-channel output audio signal according to said predefined loudspeaker layout;

determine a maximum output energy of said multi-channel output audio signal based on the estimated respective output signal energies; and determine, on basis of said maximum output energy, a gain value for adjusting sound reproduction gain in at least one of said channels of the multi-channel output audio signal in synthesis with the multi-channel output audio signal.

2. The apparatus according to claim 1, wherein said multi-channel input audio signal comprises two or more audio signals that represent a sound captured by respective two or more microphones of a microphone array.

3. The apparatus according to claim 1, wherein said multi-channel input audio signal comprises one or more intermediate audio signals derived from two or more audio signals that represent a sound captured by respective two or more microphones of a microphone array.

4. The apparatus according to claim 1, wherein the computer program code, when executed by the at least one processor, further causes the apparatus to determine the gain value by utilizing a predefined function and the determined maximum output energy.

5. The apparatus according to claim 4, wherein said predefined function models an increasing piece-wise linear function of two or more linear sections, where a slope of at least one section is smaller than that of lower sections.

6. The apparatus according to claim 4, wherein said predefined function is provided by a predefined gain lookup table that defines a mapping between a plurality of pairs of maximum energy and gain value including a maximum energy and the gain value, and wherein determining the gain value comprises identifying maximum energy of the gain lookup table that is closest to said determined maximum output energy.

7. An apparatus configured to process a multi-channel input audio signal representing a sound field into a multi-channel output audio signal in accordance with a predefined loudspeaker layout, the apparatus comprising at least one processor; and at least one memory including computer program code, which when executed by the at least one processor, causes the apparatus to:

obtain spatial audio parameters associated with said sound field;

estimate a signal energy of the sound field, wherein estimating the signal energy of the sound field comprises combining audio signals of the multi-channel input audio signal and determining the signal energy based on the combined audio signals;

estimate, based on said determined signal energy and the obtained spatial audio parameters, respective output signal energies for channels of the multi-channel output audio signal according to said predefined loudspeaker layout;

determine a maximum output energy of said multi-channel output audio signal based on the estimated respective output signal energies; and determine, on basis of said maximum output energy, a gain value for adjusting sound reproduction gain in at least one of said channels of the multi-channel output audio signal in synthesis with the multi-channel output audio signal.

8. The apparatus according to claim 7, wherein said multi-channel input audio signal comprises two or more audio signals that represent a sound captured by respective two or more microphones of a microphone array.

9. The apparatus according to claim 7, wherein said multi-channel input audio signal comprises one or more intermediate audio signals derived from two or more audio signals that represent a sound captured by respective two or more microphones of a microphone array.

10. The apparatus according to claim 7, wherein the computer program code, when executed by the at least one processor, further causes the apparatus to determine the gain value by utilizing a predefined function and the determined maximum output energy.

11. The apparatus according to claim 10, wherein said predefined function models an increasing piece-wise linear function of two or more linear sections, where a slope of at least one section is smaller than that of lower sections.

12. The apparatus according to claim 10, wherein said predefined function is provided by a predefined gain lookup table that defines a mapping between for a plurality of pairs of maximum energy and gain value including a maximum energy and the gain value, and wherein deriving determining the gain value comprises identifying maximum energy of the gain lookup table that is closest to said determined maximum output energy.

13. An apparatus configured to process a multi-channel input audio signal representing a sound field into a multi-channel output audio signal in accordance with a predefined loudspeaker layout, the apparatus comprising at least one processor; and at least one memory including computer program code, which when executed by the at least one processor, causes the apparatus to:

obtain spatial audio parameters that are descriptive of spatial characteristics of said sound field based on the multi-channel input audio signal;

estimate, based on said obtained spatial audio parameters, respective output signal energies for channels of the multi-channel output audio signal according to said predefined loudspeaker layout; and determine at least one gain value for adjusting sound reproduction gain in at least one of said channels of the multi-channel output audio signal in synthesis based on the obtained spatial audio parameters, the predefined loudspeaker layout, at least one of the estimated respective output signal energies and the multi-channel input audio signal.

14. The apparatus according to claim 13, wherein said multi-channel input audio signal comprises two or more audio signals that represent a sound captured by respective two or more microphones of a microphone array.

15. The apparatus according to claim 13, wherein said multi-channel input audio signal comprises one or more intermediate audio signals derived from two or more audio signals that represent a sound captured by respective two or more microphones of a microphone array.

16. The apparatus according to claim 13, wherein the computer program code, when executed by the at least one processor, further causes the apparatus to determine the at least one gain value by utilizing a predefined function and a maximum output energy of said multi-channel output audio signal that is determined based on the estimated respective output signal energies.

17. A method for processing a multi-channel input audio signal representing a sound field into a multi-channel output audio signal in accordance with a predefined loudspeaker layout, the method comprising:

obtaining spatial audio parameters that are descriptive of spatial characteristics of said sound field based on the multi-channel input audio signal;

estimating, based on said obtained spatial audio parameters, respective output signal energies for channels of the multi-channel output audio signal according to said predefined loudspeaker layout; and determining at least one gain value for adjusting sound reproduction gain in at least one of said channels of the multi-channel output audio signal in synthesis based on the obtained spatial audio parameters, the predefined loudspeaker layout, at least one of the estimated respective output signal energies and the multi-channel input audio signal.

18. The method according to claim 17, wherein said multi-channel input audio signal comprises two or more audio signals that represent a sound captured by respective two or more microphones of a microphone array.

19. The method according to claim 17, wherein said multi-channel input audio signal comprises one or more intermediate audio signals derived from two or more audio signals that represent a sound captured by respective two or more microphones of a microphone array.

20. The method according to claim 17, wherein determining the at least one gain value comprises utilizing a predefined function and a maximum output energy of said multi-channel output audio signal that is determined based on the estimated respective output signal energies.

* * * * *